（12） United States Patent
Yamada et al.

(10) Patent No.: US 8,475,970 B2
(45) Date of Patent: Jul. 2, 2013

(54) FLUOROESIN-COATED POLYMER FILM FOR REINFORCING POLYMER ELECTROLYTE MEMBRANE, REINFORCED POLYMER ELECTROLYTE MEMBRANE, AND MEMBRANE ELECTRODE ASSEMBLY

(75) Inventors: Hideki Yamada, Tokyo (JP); Shizu Okazaki, Tokyo (JP); Hiroyoshi Fujimoto, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 407 days.

(21) Appl. No.: 12/863,624

(22) PCT Filed: Jan. 15, 2009

(86) PCT No.: PCT/JP2009/050905
§ 371 (c)(1),
(2), (4) Date: Sep. 16, 2010

(87) PCT Pub. No.: WO2009/093620
PCT Pub. Date: Jul. 30, 2009

(65) Prior Publication Data
US 2011/0053042 A1    Mar. 3, 2011

(30) Foreign Application Priority Data

Jan. 21, 2008 (JP) ................... 2008-010832

(51) Int. Cl.
*H01M 8/10* (2006.01)
*C25B 13/08* (2006.01)

(52) U.S. Cl.
USPC ............... 429/492; 429/510; 204/296

(58) Field of Classification Search
None
See application file for complete search history.

(56) References Cited

FOREIGN PATENT DOCUMENTS

| | | | |
|---|---|---|---|
| JP | 5-174845 | A | 7/1993 |
| JP | 9-169822 | A | 6/1997 |
| JP | 2001-113141 | A | 4/2001 |
| JP | 2001-129940 | A | 5/2001 |
| JP | 2003-261702 | A | 9/2003 |

*Primary Examiner* — Jonathan Crepeau
(74) *Attorney, Agent, or Firm* — Allan M. Wheatcraft

(57) ABSTRACT

Disclosed is a fluororesin-coated polymer film for reinforcing a polymer electrolyte membrane, wherein the fluororesin-coated polymer film is fabricated by forming on at least one side of a polymer film a coating of a reaction product of (A) a fluorine-containing copolymer composed of a fluoroolefin, a cyclohexyl group-containing acrylic ester, and a hydroxyl group-containing vinyl ether, and (B) a crosslinking agent having two or more isocyanate groups. The polymer film according to the present invention not only exhibits sufficiently high initial adhesion strength, with respect to the polymer electrolyte membrane, but also retains thereafter high adhesion strength in actual operating environments.

3 Claims, 1 Drawing Sheet

FLUOROESIN-COATED POLYMER FILM FOR REINFORCING POLYMER ELECTROLYTE MEMBRANE, REINFORCED POLYMER ELECTROLYTE MEMBRANE, AND MEMBRANE ELECTRODE ASSEMBLY

TECHNICAL FIELD

The present invention relates to a fluororesin-coated polymer film for reinforcing a polymer electrolyte membrane, a polymer electrolyte membrane reinforced with such a polymer film, and a membrane electrode assembly for use in a fuel cell or electrolysis, that includes such a polymer electrolyte membrane.

BACKGROUND ART

In recent years, a polymer electrolyte membrane having a very small thickness, for example, 50 μm or less, has come to be employed as a polymer electrolyte membrane for use in a fuel cell, electrolysis, or electrodialysis, in order to reduce its electrical resistance and thereby further enhance efficiency. However, such a thin polymer electrolyte membrane has a problem that the membrane is not only inconvenient to handle but it is also prone to breakage, because it does not have the physical strength required of a structural supporting member. To overcome this problem, generally it is necessary to reinforce the polymer electrolyte membrane.

In order to increase the mechanical strength of a thin ion-exchange membrane used in a membrane electrode assembly for a polymer electrolyte membrane fuel cell, it is known to provide a seal member which is integrally formed in overlapping fashion around the circumference of a current collector having a five-layer structure comprising an anode current collector, anode catalyst layer, ion-exchange membrane, cathode catalyst layer, and cathode current collector (Japanese Unexamined Patent Publication No. H08-45517). Further, for a polymer electrolyte membrane fuel cell comprising an ion-exchange membrane, gas diffusion electrodes disposed one on each side of the ion-exchange membrane, and current collectors disposed one on the outside of each gas diffusion electrode, it is known to reinforce the periphery of the ion-exchange membrane in the polymer electrolyte membrane fuel cell by forming a resin film around the periphery of the ion-exchange membrane and attaching each gas diffusion electrode in such a manner as to contact or adhere to both the ion-exchange membrane and the resin film (Japanese Unexamined Patent Publication No. H05-174845). On the other hand, in order to prevent breakage of a solid polymer electrolyte membrane in a solid polymer electrolyte membrane fuel cell, it is known to provide a protective film having a frame-like shape formed in a partially overlapping fashion with an electrode and in intimate contact with the peripheral portion of the solid polymer electrolyte membrane disposed at least on one side of the solid polymer electrolyte membrane (Japanese Unexamined Patent Publication No. H05-21077). Further, for a solid polymer fuel cell comprising an ion-exchange membrane and a gas diffusion electrode made up of a catalyst layer and diffusion layer disposed on each side of the ion-exchange membrane, it is known to provide a frame-like reinforcing film having a window opened therein that matches the shape of the catalyst layer disposed at least on one side of the ion-exchange membrane in order to prevent breakage of the thin ion-exchange membrane in the solid polymer fuel cell (Japanese Unexamined Patent Publication No. H10-154521).

Japanese Unexamined Patent Publication No. 2001-129940 describes that when a fluorine-containing copolymer composed of a fluoroolefin, a cyclohexyl group-containing acrylic ester, and a hydroxyl group-containing vinyl ether is applied, together with a crosslinking agent having an isocyanate group, to one and/or both sides of a polyester film and heated, a mold release film having good adhesion to the base film can be obtained. However, Japanese Unexamined Patent Publication No. 2001-129940 provides no description that such a mold release film has excellent adhesion to a polymer electrolyte membrane.

DISCLOSURE OF THE INVENTION

A reinforcing film fabricated in accordance with the technique disclosed in each of Japanese Unexamined Patent Publication Nos. H08-45517, H05-174845, H05-21077, and H10-154521, has sufficient strength. However, it has been found that a sufficient reinforcing effect may not be obtained depending on the means used to adhere the reinforcing film to the solid polymer electrolyte membrane. In particular, in the case of adhesion that uses a liquid silicone rubber adhesive as described in Japanese Unexamined Patent Publication No. H08-45517, the hot press means that uses an ion-exchange resin solution as an adhesive as described in Japanese Unexamined Patent Publication No. H05-174845, and the thermocompression means used to bond the fluorine-based resin sheet to the electrolyte membrane as described in Japanese Unexamined Patent Publication No. H05-21077, initial adhesion strength is not sufficient. On the other hand, in the case of adhesion that uses a fluororesin-based tackifier as described in Japanese Unexamined Patent Publication No. H10-154521, sufficient durability cannot be obtained for practical applications because adhesion strength decreases under operating conditions, such as in hot water, a high temperature or a high humidity environment.

Accordingly, it is an object of the present invention to provide a polymer electrolyte membrane reinforcing polymer film having an adhesive means that not only exhibits sufficiently high initial adhesion strength with respect to a polymer electrolyte membrane but also retains thereafter sufficiently high adhesion strength in actual operating environments.

According to the present invention, there are provided:

[1] a fluororesin-coated polymer film for reinforcing a polymer electrolyte membrane, wherein the fluororesin-coated polymer film is fabricated by forming on at least one side of a polymer film a coating of a reaction product of (A) a fluorine-containing copolymer composed of a fluoroolefin represented by formula (1) below, a cyclohexyl group-containing acrylic ester represented by formula (2) below, and a hydroxyl group-containing vinyl ether represented by formula (3) below, and (B) a crosslinking agent having two or more isocyanate groups, the formulas (1), (2), and (3) being given as

(where X is F or H, and Y is H, Cl, F, or $CF_3$)

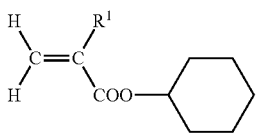

(where R[1] is a hydrogen or methyl group), and

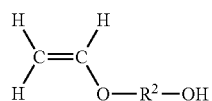

(where R[2] is an alkylene group with a carbon number of 2 to 5 or a cyclohexylene group);

[2] the fluororesin-coated polymer film as described in item 1, wherein the fluorine-containing copolymer (A) contains 40 to 90 mole % of the fluoroolefin, 1 to 30 mole % of the cyclohexyl group-containing acrylic ester, and 1 to 30 mole % of the hydroxyl group-containing vinyl ether;

[3] a reinforced polymer electrolyte membrane wherein the fluororesin-coated polymer film as described in item 1 or 2 is bonded to at least one side of a polymer electrolyte membrane with the fluororesin-coated face of the polymer film contacting a peripheral portion of the polymer electrolyte membrane in a frame-like manner.

[4] the reinforced polymer electrolyte membrane as described in item 3, wherein the polymer electrolyte membrane includes a fluorine-based ion-exchange resin; and

[5] a membrane electrode assembly for use in a fuel cell or electrolysis, wherein the membrane electrode assembly includes the reinforced polymer electrolyte membrane as described in item 3 or 4.

According to the present invention, when the specific fluorine-containing coating described in Japanese Unexamined Patent Publication No. 2001-129940 as being a mold release film is applied to a polymer electrolyte membrane reinforcing polymer film, the resulting polymer film not only exhibits sufficiently high initial adhesion strength with respect to the polymer electrolyte membrane but also retains thereafter high adhesion strength in actual operating environments, and durability of the polymer electrolyte membrane thus increases. It was quite an unexpected discovery that the material taught as being a "mold release agent" was effective as an "adhesive agent."

BEST MODE FOR CARRYING OUT THE INVENTION

Figure 1:
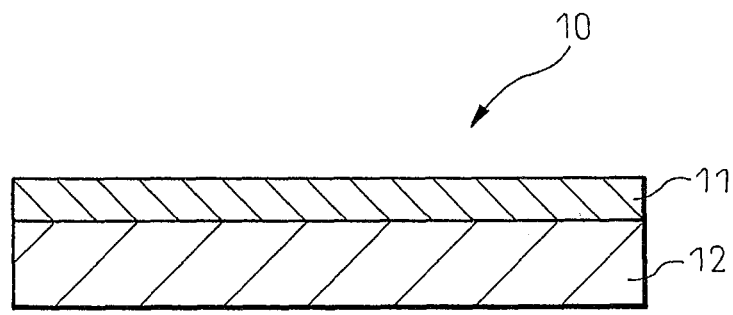
FIG. 1 is a schematic cross-sectional view showing a fluororesin-coated polymer film for reinforcing a polymer electrolyte membrane according to the present invention.

The present invention relates to a fluororesin-coated polymer film for reinforcing a polymer electrolyte membrane, that is fabricated by forming on at least one side of a polymer film a coating of a reaction product (fluororesin) of (A) a fluorine-containing copolymer composed of a fluoroolefin, a cyclohexyl group-containing acrylic ester, and a hydroxyl group-containing vinyl ether, and (B) a crosslinking agent having two or more isocyanate groups. FIG. 1 shows a schematic cross-sectional view of a fluororesin-coated polymer film for reinforcing a polymer electrolyte membrane. In FIG. 1, the fluororesin-coated polymer film 10 comprises a fluororesin coating 11 and a polymer film 12.

The reinforcing polymer film used in the present invention is preferably a polyethylene naphthalate (PEN) film, however other polyester films, such as a polyethylene terephthalate (PET) film, or super engineering plastic films, such as a polyphenylene sulfide (PPS) film, a polyethersulfone (PES) film, a polysulfone (PS) film, a polyether ether ketone (PEEK) film, and a liquid-crystal polymer film may also be used. The thickness of the reinforcing polymer film is generally in the range of 1 to 200 µm, and preferably in the range of 5 to 100 µm.

The fluorine-containing copolymer (A) used in the present invention comprises a fluoroolefin, a cyclohexyl group-containing acrylic ester, and a hydroxyl group-containing vinyl ether as essential constituents. In the present invention, the fluoroolefin is an olefin having at least two fluorine atoms within the molecule represented by the above formula (1); for example, vinylidene fluoride, tetrafluoroethylene, chlorotrifluoroethylene, hexafluoropropene, etc. are preferable. These fluoroolefins may be used singly or in a combination of two or more of them.

In the present invention, the cyclohexyl group-containing acrylic ester is represented by the above formula (2), and specific examples include cyclohexyl acrylate, cyclohexyl methacrylate, etc., among which cyclohexyl methacrylate is particularly preferable.

In the present invention, the hydroxyl group-containing vinyl ether is represented by the above formula (3), and specific examples include hydroxymethyl vinyl ether, hydroxyethyl vinyl ether, hydroxypropyl vinyl ether, hydroxybutyl vinyl ether, hydroxy-cyclohexyl vinyl ether, etc., among which hydroxybutyl vinyl ether, hydroxyethyl vinyl ether, and hydroxy-cyclohexyl vinyl ether are preferable. These hydroxyl group-containing vinyl ethers may be used singly or in a combination of two or more of them.

In the present invention, the fluorine-containing copolymer is composed of the fluoroolefin, the cyclohexyl group-containing acrylic ester, and the hydroxyl group-containing vinyl ether, as described above, but in addition to these components, it may further include other copolymerizable components in an amount not greater than 20 mole % according to the purpose of use, etc. Examples of such copolymerizable components include alkyl vinyl ethers such as ethyl vinyl ether, butyl vinyl ether, cyclohexyl vinyl ether, etc., olefins, such as ethylene, propylene, etc., halo-olefins, such as vinyl chloride, vinylidene chloride, etc., and vinyl carboxylate esters such as vinyl acetate, vinyl n-butyrate, vinyl versatate, etc.

The copolymerization proportions of the components constituting the fluorine-containing copolymer according to the present invention are preferably 40 to 90 mole % of fluoroolefin, 1 to 30 mole % of cyclohexyl group-containing acrylic ester, and 1 to 30 mole % of hydroxyl group-containing vinyl ether. If the proportion of the fluoroolefin is less than 40 mole %, water resistance of the resulting fluororesin coating decreases, degrading the durability under operating conditions of a fuel cell, etc. Conversely, if the proportion of the fluoroolefin exceeds 90 mole %, its solvent solubility decreases, making it difficult to apply the coating to the film. If the proportion of the cyclohexyl group-containing acrylic ester is less than 1 mole %, the storage stability of the resin solution degrades, which is undesirable; conversely, if it is larger than 30%, the polymerization speed at the time of polymerization drops, which is also undesirable. If the proportion of the hydroxyl group-containing vinyl ether is less than 1 mole %, curing reaction is difficult, and if it is larger than 30%, copolymerization reaction is difficult.

The fluorine-containing copolymer can be produced by copolymerizing the above constituent components, in the presence or absence of a solvent, by using a polymerization initiator. As the polymerization initiator, a water-soluble polymerization initiator or an oil-soluble polymerization initiator may be used, whichever is appropriate according to the kind of the solvent used for the polymerization. As the water-soluble polymerization initiator, for example, a persulfate such as potassium persulfate, hydrogen peroxide, or a redox initiator composed of a combination of any one of them with a reducing agent such as sodium bisulfite or sodium thiosulfate, an inorganic initiator produced by adding a small amount of iron, ferrous salt, silver nitrate, or the like to the above material, or an organic initiator such as succinate peroxide, diglutaric peroxide, monosuccinic peroxide, or other dibasic acid salt may be used. For the oil-soluble initiator, for example, a peroxyester-type peroxide such as t-butyl peroxyisobutyrate, t-butyl peroxyacetate, or the like, a dialkyl peroxydicarbonate such as diisopropyl peroxycarbonate, dinormalpropyl peroxycarbonate, or the like, a benzoyl peroxide, azobisisobutyronitrile, etc. may be used. The amount of the polymerization initiator to be used is suitably selected in accordance with such factors as the kind of the initiator and copolymerization reaction conditions, but preferably, the amount is selected within the range of 0.005 to 5% by mass, and more preferably within the range of 0.1 to 1% by mass with respect to the total amount of the monomers.

The polymerization method for the fluorine-containing copolymer is not specifically limited, and, for example, bulk polymerization, suspension polymerization, emulsion polymerization, solution polymerization, etc. may be used, among which solution polymerization using, as a solvent, a ketone, such as methylethyl ketone, an ester, such as ethyl acetate, or a saturated halogenated hydrocarbon containing one or more fluorine atoms, and emulsion polymerization using an aqueous medium are preferable. When performing copolymerization in an aqueous medium, it is usually desirable to use a suspending agent or emulsifying agent as a dispersion stabilizer and to hold the pH value of the reaction solution at 4 or higher, preferably at 6 or higher, during the polymerization by adding a basic buffering agent. The reaction temperature in the copolymerization reaction is suitably selected usually within the range of −30° C. to 150° C. according to the kind of the polymerization initiator and the kind of the polymerization medium. For example, when performing polymerization in an aqueous medium, the temperature is selected usually within the range of 0 to 100° C., and preferably within the range of 10 to 90° C. The reaction pressure is not specifically limited, but it is selected usually within the range of $9.8 \times 10^4$ to $9.8 \times 10^6$ N/m$^2$, and preferably within the range of $9.8 \times 10^4$ to $5.9 \times 10^6$ N/m$^2$. Further, the copolymerization can be performed by adding a suitable chain transfer agent.

In the present invention, the reaction product of the fluorine-containing copolymer (A) and the crosslinking agent (B) having two or more isocyanate groups is formed on one or both sides of the polymer film. Examples of the crosslinking agent (B) having two or more isocyanate groups include diisocyanates, such as hexamethylene diisocyanates, isophorone diisocyanates, etc., triisocyanates, such as tris(phenylisocyanate) thiophosphates, etc., and polyvalent isocyanates having isocyanurates.

In the present invention, examples of the solvent used when preparing a coating solution from the fluorine-containing copolymer and the crosslinking agent having two or more isocyanate groups, include aromatic hydrocarbons, such as xylene, toluene, etc., alcohols, such as n-butanol, etc., esters, such as butyl acetate, ethyl acetate, etc., ketones, such as methylethyl ketone, methylisobutyl ketone, etc., glycol ethers, such as ethyl cellosolve, etc., and various kinds of commercially available thinners. The concentration of the fluorine-containing copolymer in the coating solution is generally in the range of 5 to 80% by mass, and preferably in the range of 10 to 60% by mass.

The fluorine-containing copolymer and the crosslinking agent can be mixed into the solvent by using, for example, a ball mill, a paint shaker, a sand mill, a triple roll mill, a kneader, etc. At this time, a pigment, a dispersion stabilizer, a viscosity modifier, a leveling agent, a UV absorber, etc., may be added.

The fluororesin-coated polymer film according to the present invention can be fabricated using a method in which the coating solution, prepared by mixing the fluorine-containing copolymer and the crosslinking agent having two or more isocyanate groups into the solvent, is applied to a base polymer film, or using a method known as an inline coating method in which the coating solution is first applied to a nonexpanded film and the film is then expanded. The coating solution can be applied using any known coating method, for example, a gravure roll method, a spray method, or a roll coater method, among which the gravure roll method is suitable from the viewpoint of adjusting the coating thickness. It is desirable that physical or chemical treatment, such as corona treatment, be applied in advance to the base polymer film in order to enhance its affinity for the coating solution and to achieve good adhesion to the fluorine-containing copolymer after drying. The coating thickness after drying the coating solution is preferably in the range of 0.1 to 2 μm, and more preferably in the range of 0.5 to 1.5 μm. If the coating thickness is less than 0.1 μm, it is difficult to achieve good peel strength which fluorine inherently has, and if the coating thickness is greater than 2 μm, no further increase in performance can be obtained, but only cost increases, which is not desirable.

By forming a coating of the reaction product of the fluorine-containing copolymer and the crosslinking agent having two or more isocyanate groups on the surface of the film coated with the coating solution, the fluororesin-coated polymer film according to the present invention can be obtained. When forming the reaction product, it is preferable to hold the coated surface at temperatures of 35 to 110° C. for 5 to 72 hours after heat treatment at 100 to 140° C. for 5 to 120 seconds, and more preferably, the coated surface is maintained at temperatures of 40 to 80° C. for 40 to 50 hours after the heat treatment.

The polymer electrolyte membrane to be reinforced is not specifically limited, but any known polymer electrolyte membrane can be used as long as it has a high proton (H+) conductivity, is an electronic insulator, and is impermeable to gases. A typical example is a resin having a fluorine-containing polymer as a skeleton and containing groups such as sulfonic, carboxyl, phosphoric, and phosphonic groups. Since the thickness of the polymer electrolyte membrane greatly affects resistance, it is required that the thickness be as small as possible, as long as it does not impair the electronic insulation and gas impermeability; specifically, the thickness is chosen to fall within the range of 1 to 70 μm, and preferably within the range of 5 to 50 μm. The material for the polymer electrolyte membrane used in the present invention is not limited to a fully fluorinated polymer compound, but a mixture with a hydrocarbon-based polymer compound or an inorganic polymer compound, or of a partially fluorinated polymer compound containing both C—H and C—F bonds in the polymer chain may be used. Specific examples of the hydrocarbon-based polymer electrolyte include: polyamide, polyacetal, polyethylene, polypropylene, acrylic resin, polyester, polysulfone, polyether, etc., into which an electrolyte group such as a sulfonic group is introduced, and their derivatives (aliphatic hydrocarbon-based polymer electrolyte); polystyrene, polyamide having an aromatic ring, polyamideimide, polyimide, polyester, polysulfone, polyetherimide, polyethersulfone, polycarbonate, etc., into which an electrolyte group such as a sulfonic group is introduced, and their derivatives (partially aromatic hydrocarbon-based polymer electrolyte); and polyether-etherketone, polyetherketone, polyethersulfone, polycarbonate, polyamide, polyamideimide, polyester, polyphenylene sulfide, etc., into which an electrolyte group, such as a sulfonic group, is introduced, and their derivatives (fully aromatic hydrocarbon-based polymer electrolyte). Specific examples of the partially fluorinated polymer electrolyte include a polystyrene-graft-ethylenetetrafluoroethylene copolymer, polystyrene-graft-polytetrafluoroethylene copolymer, etc., into which an electrolyte group, such as a sulfonic group, is introduced, and their derivatives. Specific examples of the fully fluorinated polymer electrolyte membrane include a Nafion (registered trademark) membrane (manufactured by DuPont), an Aciplex (registered trademark) membrane (manufactured by Asahi Kasei), and a Flemion (registered trademark) membrane (manufactured by Asahi Glass), which are a perfluoro polymer having a sulfonic group in a side chain. For the inorganic polymer compound, a siloxane- or silane-based, in particular, alkylsiloxane-based, organic silicon polymer compound is preferable, specific examples including polydimethyl siloxane, γ-glycidoxypropyltrimetoxysilane, etc. Further, GORE-SELECT (registered trademark) (manufactured by Japan Gore-Tex), which is a reinforced polymer electrolyte membrane formed by impregnating an ion-exchange resin into a porous expanded polytetrafluoroethylene membrane, can also be used advantageously.

Figure 2:
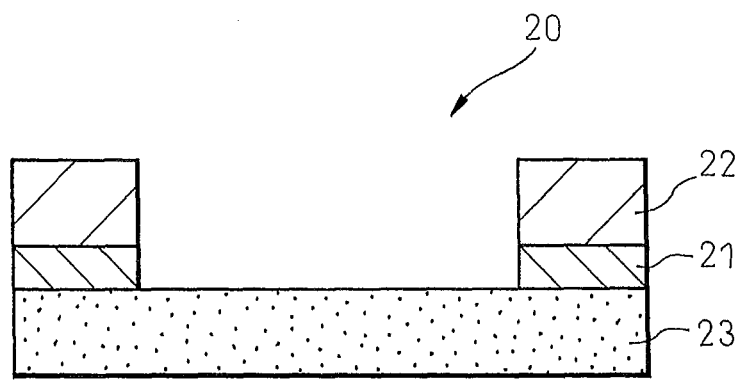
FIG. 2 is a schematic cross-sectional view showing the reinforced polymer electrolyte membrane according to the present invention.

The reinforced polymer electrolyte membrane according to the present invention can be fabricated by bonding the fluororesin-coated polymer film of the present invention to the above-described polymer electrolyte membrane in such a manner that the fluororesin-coated face of the polymer film contacts the polymer electrolyte membrane. The bonding of the fluororesin-coated polymer film to the polymer electrolyte membrane can be accomplished by heating them at a temperature in the range of 60° C. to 200° C., preferably in the range of 100° C. to 150° C. The heating may be performed while at the same time applying a suitable pressure using, for example, a heat press or heat roller. The bonding portion is generally chosen to be the peripheral portion on at least one side of the polymer electrolyte membrane, and usually the frame-like portion that does not contact the electrode layer to be described later. A schematic cross-sectional view of the thus reinforced polymer electrolyte membrane is shown in FIG. 2. In FIG. 2, the reinforced polymer electrolyte membrane 20 includes the polymer electrolyte membrane 23 and the fluororesin-coated polymer film 22 bonded in a frame-like manner to the peripheral portion on one side of the polymer electrolyte membrane 23, and the fluororesin coating 21 is in contact with the polymer electrolyte membrane 23.

A membrane electrode assembly can be fabricated by providing electrode layers on both sides of the solid polymer electrolyte membrane reinforced according to the present invention. The material for the electrode layers used in the membrane electrode assembly is not specifically limited, but any prior known one can be used as long as it contains catalyst particles and an ion-exchange resin. The catalyst used here is usually formed from an electrically conductive material loaded with catalyst particles. For the catalyst particles, any material that exhibits catalytic activity for hydrogen oxidation reaction or oxygen reduction reaction can be used, examples including platinum (Pt) and other noble metals, or iron, chromium, nickel, etc. and their alloys. For the electrically conductive material, carbon-based particles, such as carbon black, activated carbon, graphite, etc., are preferable, and among others, fine powdered particles are advantageously used. In a typical example, noble metal particles, for example, Pt particles, or alloy particles of Pt and other metal, are carried on carbon black particles having a surface area of 20 $m^2/g$ or larger. In particular, for the anode catalyst, when using a fuel, such as methanol, that generates carbon monoxide (CO) in a side reaction, or when using a gas produced by reforming methane or the like, it is preferable to use alloy particles of Pt and ruthenium (Ru) because Pt alone is easily poisoned by CO. The ion-exchange resin used in the electrode layer is a material that supports the catalyst and that serves as a binder when forming the electrode layer, and has the role of providing a passage through which ions, etc., formed by catalyst reaction move. For such an ion-exchange resin, a similar one to that described earlier in connection with the polymer electrolyte membrane can be used. It is preferable to form the electrode layer in a porous structure to maximize the surface area where the catalyst contacts the fuel gas, such as hydrogen or methanol, on the anode side, or the oxidizer gas, such as oxygen or air, on the cathode side. The amount of catalyst contained in the electrode layer is preferably in the range of 0.01 to 1 $mg/cm^2$, and more preferably in the range of 0.1 to 0.5 $mg/cm^2$. The thickness of the electrode layer is generally in the range of 1 to 20 μm, and preferably in the range of 5 to 15 μm.

The membrane electrode assembly intended for use in a solid polymer fuel cell further includes a gas diffusion layer. The gas diffusion layer is a sheet material having electrical conductivity and air permeability. In a typical example, the gas diffusion layer is prepared by applying water-repellent treatment to an air permeable, electrically conductive substrate such as carbon paper, carbon woven fabric, carbon nonwoven fabric, carbon felt, or the like. It is also possible to use a porous sheet formed from carbon-based particles and a fluorine-based resin. For example, a porous sheet prepared by molding carbon black into a sheet using polytetrafluoroethylene as a binder may be used. The thickness of the gas diffusion layer is generally in the range of 50 to 500 μm and preferably in the range of 100 to 400 μm.

The membrane electrode assembly is fabricated by bonding together the electrode layers, the gas diffusion layers, and the reinforced polymer electrolyte membrane. For the bonding method, any prior known method can be employed, as long as solid bonding having low contact resistance can be accomplished without damaging the polymer electrolyte membrane. In accomplishing the bonding, first the anode electrode or cathode electrode is formed by combining the electrode layer with the gas diffusion layer, and then the electrode may be bonded to the polymer electrolyte membrane. For example, an electrode-layer-forming coating solution that contains catalyst particles and an ion-exchange resin is prepared using a suitable solvent, and the solution thus prepared is applied over a gas-diffusion-layer-forming sheet material to form the anode electrode or cathode electrode and then the resulting structure is bonded to the polymer electrolyte membrane by hot pressing. Alternatively, the electrode layer may first be combined with the polymer electrolyte membrane, and then the gas diffusion layer may be bonded to the electrode layer side. When combining the electrode layer with the polymer electrolyte membrane, a prior known method, such as a screen printing method, a spray coating method, or a decal method, can be used.

A solid polymer fuel cell stack can be assembled by stacking, in accordance with a prior known method, 5 to 100 cells of such membrane electrode assemblies one on top of another with the anode and cathode of each cell located on the designated sides and with a separator plate and a cooling section interposed between each individual cell.

EXAMPLES

Example 1

In an ethyl acetate solution containing 30% by mass of a fluorine-containing copolymer (KD200 manufactured by Kanto Denka Kogyo) composed of a fluoroolefin, a cyclohexyl group-containing acrylic ester, and a hydroxyl group-containing vinyl ether, hexamethylene diisocyanate was dissolved as a crosslinking agent in an amount equivalent to 1.4 times the OH value of KD200, to prepare a coating solution. The coating solution was then applied using a wirebar coater to an easy-adhesion treated surface of a biaxially expanded PEN film having a thickness of 50 μm and a size of 20 cm×30 cm (Teonex manufactured by Teijin DuPont, with one side pretreated for easy adhesion) and after heat-treating at 140° C. for one minute, was heat-treated at 70° C. for 48 hours to obtain a fluororesin-coated PEN film having a coating thickness of 1 μm. After the film was cut into a frame-like shape having outer dimensions of 8 cm×8 cm and inner dimensions of 5 cm×5 cm, the film with its coated side facing inward was overlaid on a solid polymer electrolyte membrane (GORE-SELECT manufactured by Japan Gore-Tex) having a thickness of 30 μm and outer dimensions of 8 cm×8 cm, and was heated at 160° C. for five minutes under pressure by hot pressing, to obtain a PEN film reinforced polymer electrolyte membrane.

Example 2

A coating solution prepared in the same manner as in Example 1 was applied in the same manner as in Example 1 to a corona-discharge treated surface of a PPS film having a thickness of 50 μm and a size of 20 cm×30 cm, to obtain fluororesin-coated PPS film having a coating thickness of 1 μm. After the film was cut into a frame-like shape having outer dimensions of 8 cm×8 cm and inner dimensions of 5 cm×5 cm, as in Example 1, the film with its coated side facing inward was overlaid on a solid polymer electrolyte membrane (GORE-SELECT manufactured by Japan Gore-Tex) having a thickness of 30 μm and outer dimensions of 8 cm×8 cm, and was heated at 160° C. for five minutes under pressure by hot pressing, to obtain a PPS film reinforced polymer electrolyte membrane.

Comparative Example 1

A PEN film coated with an acrylic tackifier on one side thereof was cut into a frame-like shape having a thickness of 50 μm, outer dimensions of 8 cm×8 cm, and inner dimensions of 5 cm×5 cm, and the thus prepared PEN film with its tackifier-coated side facing inward was overlaid on a solid polymer electrolyte membrane (GORE-SELECT manufactured by Japan Gore-Tex) having a thickness of 30 μm and outer dimensions of 8 cm×8 cm, and pressed together to obtain a PEN reinforced polymer electrolyte membrane.

Comparative Example 2

A PEN film (Teonex manufactured by Teijin DuPont, with one side pretreated for easy adhesion) was cut into a frame-like shape having outer dimensions of 8 cm×8 cm and inner dimensions of 5 cm×5 cm, and the thus prepared PEN film with its easy-adhesion treated side facing inward was overlaid on a solid polymer electrolyte membrane (GORE-SELECT manufactured by Japan Gore-Tex) having a thickness of 30 μm and outer dimensions of 8 cm×8 cm, and was heated at 160° C. for five minutes under pressure by hot pressing, to obtain a PEN film reinforced polymer electrolyte membrane.

Comparative Example 3

An adhesive formed from a polyvinyl acetate resin emulsion (PVAC) was applied using a wirebar coater to an easy-adhesion treated surface of a PEN film having a size of 20 cm×30 cm (Teonex manufactured by Teijin DuPont, with one side pretreated for easy adhesion), and was dried at 80° C. for three minutes to obtain a PVAC-coated PEN film having a coating thickness of 3 μm. After the film was cut into a frame-like shape having outer dimensions of 8 cm×8 cm and inner dimensions of 5 cm×5 cm, the film with its coated side facing inward was overlaid on a solid polymer electrolyte membrane (GORE-SELECT manufactured by Japan Gore-Tex) having a thickness of 30 μm and outer dimensions of 8 cm×8 cm, and was heated at 160° C. for five minutes under pressure by hot pressing, to obtain a PEN film reinforced polymer electrolyte membrane.

(Adhesion Strength Evaluation and Durability Test)

The adhesion strength of each of the reinforced polymer electrolyte membranes was evaluated by measuring the peel strength between the polymer electrolyte membrane and the fluororesin-coated polymer film in accordance with JIS K 6854-2:1999. The peel strength was measured on a tensile tester (AG-I manufactured by Shimadzu) set at a peel rate of 100 mm/minute, by using as a test specimen a 25-mm wide, 200-mm long strip fabricated in the same manner as the reinforced polymer electrolyte membrane.

The durability of each reinforced polymer electrolyte membrane was evaluated by measuring the peel strength in the same manner as above, after placing the test specimen for 100 hours in a saturated steam of 120° C. in a pressure cooker (SP510 manufactured by Yamato Scientific).

The results are shown in Table 1.

TABLE 1

| Comparisons of peel strengths before and after durability test | | | |
|---|---|---|---|
| | PEEL STRENGTH BEFORE DURABILITY TEST (N/25 mm) | PEEL STRENGTH AFTER DURABILITY TEST (N/25 mm) | STRENGTH RETENTION RATE (%) |
| EXAMPLE 1 | 10.0 | 9.8 | 98 |
| EXAMPLE 2 | 7.4 | 7.3 | 99 |
| COMPARATIVE EXAMPLE 1 | 13.0 | DELAMINATED DURING DURABILITY TEST | 0 |

TABLE 1-continued

Comparisons of peel strengths before and after durability test

| | PEEL STRENGTH BEFORE DURABILITY TEST (N/25 mm) | PEEL STRENGTH AFTER DURABILITY TEST (N/25 mm) | STRENGTH RETENTION RATE (%) |
|---|---|---|---|
| COMPARATIVE EXAMPLE 2 | 0.4 | DELAMINATED DURING DURABILITY TEST | 0 |
| COMPARATIVE EXAMPLE 3 | 6.9 | 1.5 | 22 |

While the reinforced polymer electrolyte membranes fabricated in accordance with the method of the present invention retained good adhesion strength before and after the durability test, none of the comparative examples were able to retain adhesion strength after the durability test.

INDUSTRIAL APPLICABILITY

According to the present invention, when a specific fluorine-containing coating is applied to a polymer electrolyte membrane reinforcing polymer film, the resulting polymer film not only exhibits sufficiently high initial adhesion strength with respect to the polymer electrolyte membrane but also retains thereafter high adhesion strength in actual operating environments, and the durability of the polymer electrolyte membrane thus increases.

What is claimed is:

1. A fluororesin-coated polymer film for reinforcing a polymer electrolyte membrane, wherein said fluororesin-coated polymer film is fabricated by forming on at least one side of a polymer film a coating of a reaction product of (A) a fluorine-containing copolymer composed of a fluoroolefin represented by formula (1) below, a cyclohexyl group-containing acrylic ester represented by formula (2) below, and a hydroxyl group-containing vinyl ether represented by formula (3) below, and (B) a crosslinking agent having two or more isocyanate groups, said formulas (1), (2), and (3) being given as

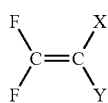
(1)

(where X is F or H, and Y is H, Cl, F, or CF$_3$)

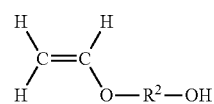
(2)

(where R$^1$ is a hydrogen or methyl group), and $$\begin{array}{c} H \\ \diagdown \\ C=C \\ \diagup \\ H \end{array} \begin{array}{c} H \\ \diagup \\ \diagdown \\ O-R^2-OH \end{array} \quad (3)$$

(where R$^2$ is an alkylene group with a carbon number of 2 to 5 or a cyclohexylene group), wherein the fluororesin-coated polymer film is bonded to at least one side of said polymer electrolyte membrane with the fluororesin-coated face of said polymer film contacting a peripheral portion of said polymer electrolyte membrane in a frame-like manner.

2. The reinforced polymer electrolyte membrane as claimed in claim 1, wherein said polymer electrolyte membrane includes a fluorine-based ion-exchange resin.

3. A membrane electrode assembly for use in a fuel cell or electrolysis, wherein said membrane electrode assembly includes the reinforced polymer electrolyte membrane as claimed in claim 1.

* * * * *